United States Patent
Yang et al.

(10) Patent No.: US 9,693,368 B2
(45) Date of Patent: Jun. 27, 2017

(54) BANDWIDTH ACQUISITION IN CONTENTION-BASED NETWORKS

(71) Applicant: QUALCOMM INCORPORATED, San Diego, CA (US)

(72) Inventors: Ou Yang, Santa Clara, CA (US); Ting-Kuo Lo, San Jose, CA (US); Keangpo Ricky Ho, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 14/605,071

(22) Filed: Jan. 26, 2015

(65) Prior Publication Data

US 2016/0218819 A1     Jul. 28, 2016

(51) Int. Cl.
    *H04L 12/26*    (2006.01)
    *H04W 74/08*    (2009.01)
    *H04L 12/40*    (2006.01)

(52) U.S. Cl.
    CPC ... *H04W 74/0816* (2013.01); *H04L 12/40045* (2013.01)

(58) Field of Classification Search
    USPC ........ 370/329, 230, 236, 252, 328, 348, 445
    See application file for complete search history.

(56) References Cited

U.S. PATENT DOCUMENTS

| | | | | |
|---|---|---|---|---|
| 2005/0105504 A1* | 5/2005 | Sakoda | ................ | H04L 1/0002 370/349 |
| 2005/0175027 A1* | 8/2005 | Miller | ................ | H04L 12/5695 370/458 |
| 2007/0058661 A1* | 3/2007 | Chow | ................ | H04L 12/417 370/445 |
| 2008/0144586 A1* | 6/2008 | Kneckt | ................ | H04W 74/002 370/337 |
| 2009/0138603 A1* | 5/2009 | Surineni | ................ | H04W 76/023 709/227 |
| 2013/0142052 A1* | 6/2013 | Burbidge | ................ | H04W 76/027 370/242 |
| 2014/0078940 A1* | 3/2014 | Aggarwal | ................ | H04L 1/1854 370/278 |
| 2015/0250002 A1* | 9/2015 | Sun | ................ | H04W 74/0808 370/329 |
| 2015/0350159 A1* | 12/2015 | Verma | ................ | H04L 43/0888 370/329 |
| 2016/0073429 A1* | 3/2016 | Oteri | ................ | H04W 74/0816 370/338 |

* cited by examiner

*Primary Examiner* — Kwang B Yao
*Assistant Examiner* — Nguyen Ngo
(74) *Attorney, Agent, or Firm* — Linda G. Gunderson

(57) ABSTRACT

Network nodes acquire bandwidth in contention-based networks for handling video traffic. A request to reserve a channel for transmission of a payload is sent prior to a network node receiving the payload. The payload is a burst of video data that is generated periodically. A network node determines a time period for reserving the channel. The network node determines when to initiate contending for the channel and the time period for transmitting the payload to another network node. A network node determines when a payload is expected to arrive and monitors its back off time period at least a time period prior to receiving a payload. The network node also monitors transmission of the payload and adjusts when to initiate contending for the channel.

18 Claims, 4 Drawing Sheets

US 9,693,368 B2

BANDWIDTH ACQUISITION IN CONTENTION-BASED NETWORKS

BACKGROUND

1. Field of the Disclosure

This disclosure pertains in general to communications, and more specifically to bandwidth acquisition in a network.

2. Description of the Related Art

Contention-based channel access mechanisms have been adopted widely. In a contention-based network, a network node such as a station, an access point, or a personal basic service set control point is required to perform DCF (Distributed Coordination Function). That is, a network node contends for the channel after a random back off period. Other stations in the network, by observing the packet, can update their local information of the channel occupancy (e.g., using a Network Allocation Vector (NAV)). Nevertheless, stations may not detect each other and send out packets to the same or another destination at the same time, resulting in collision of packets. In addition, it may be difficult to handle traffic of different priorities without causing any delays. For example, video traffic faces stringent constraints on delays and jitters. A station contending for a channel to send video packets may not be able to obtain the channel when other stations are also contending for the channel to send data at the same time. Video packets, when not sent on time, cannot comply with the timing requirements and may cause disturbance in video display. User experience, as a result, is negatively affected and disrupted.

SUMMARY

Embodiments of the present disclosure are related to a method for communicating in contention-based networks. The method includes monitoring, by a transmitting node at a first time point, a back off time period. The transmitting node sends a request to reserve a channel for transmission of a payload at a second time point prior to receiving the payload. The transmitting node receives a grant sent from a receiving node to confirm availability of the receiving node to receive the payload over the channel prior to receiving the payload. The transmitting node receives the payload. The transmitting node sends the payload over the channel at a third time point.

In one embodiment, the payload comprises an instance of a data stream that is received periodically by the transmitting node. In one embodiment, a first time period between the first time point and the second time point includes the back off time period for the transmitting node, a time period for transmitting the request, a time period for transmitting the grant, and a time period between the transmitting node sending the request and receiving the grant.

In one embodiment, the transmitting node determines an expected time point for receiving the payload. The transmitting node determines the first time point for monitoring the back off time period. The back off time period occurs a time period prior to the expected time point for receiving the payload.

In one embodiment, a transmitting node monitors when a previous grant and a previous payload are received in a previous session. The transmitting node calculates a time difference between when the previous grant is received and the previous payload is received. The transmitting node increases the time period between the first time point and the expected time point for receiving the payload in response to the time difference being less than a threshold.

In one embodiment, a transmitting node monitors when a previous grant and a previous payload are received in a previous session. The transmitting node calculates a time difference between when the previous grant is received and the previous payload is received. The transmitting node decreases the time period between the first time point and the expected time point for receiving the payload in response to the time difference being greater than a threshold.

In one embodiment, the transmitting node determines a second period of time to reserve the channel for transmitting the payload. The transmitting node specifies the second period of time with the request to reserve the channel. In one embodiment, the second period of time includes a time period for sending a data packet, a time period for the receiving node sending an acknowledgement, a time period between the transmitting node sending the data packet and receiving the acknowledgement, and a time period between the receiving node receiving the data packet and sending the acknowledgement.

In one embodiment, the transmitting node sends an end of transmission signal to indicate sending the payload is completed.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiments relate to acquiring bandwidth in contention-based networks (e.g., a wireless network, a wired network such as an Ethernet over Coax (EoC) network) for handling video traffic. A request to reserve a channel for transmission of a payload is sent prior to a network node receiving the payload, i.e., a burst of video data that is generated periodically by a data generation circuit (e.g., an encoder). A network node determines a time period for reserving the channel. The network node determines when to initiate contending for the channel and the time period for transmitting the payload. The network node also monitors transmission of the payload and adjusts when to initiate contending for the channel based on changing channel characteristics. As such, the likelihood that the network node obtains periodic channel access to deliver time-sensitive video traffic is increased and the video burst is sent timely. As a network node reserves a channel to send a burst of video data prior to receiving the burst of video data, the delay of sending the burst of video data is minimized. When the network nodes detects that due to channel conditions, it is not sufficiently likely to be able to reserve the channel during the time period prior to a network node receiving a burst of video data, the network node may increase its chance of reserving the channel by sending the request to reserve the channel for transmission of the payload multiple times.

Figure 1:
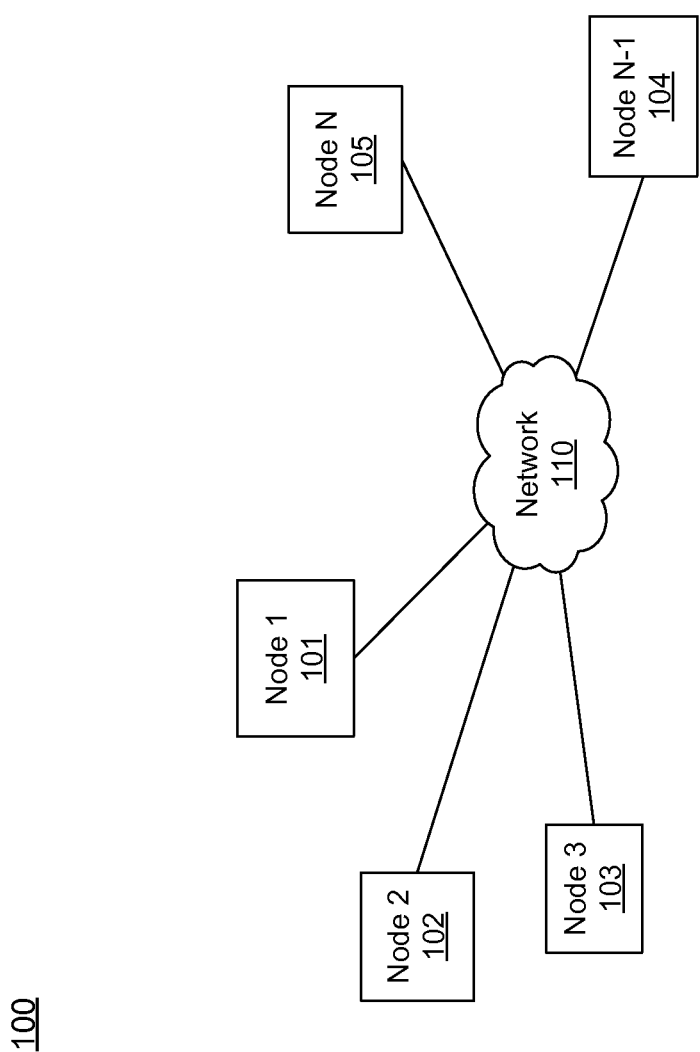
FIG. 1 is a high-level block diagram of a system for data communications, according to one embodiment.

FIG. 1 is a high-level block diagram of a system 100 for data communications, according to one embodiment. The system 100 includes a network 110 and network nodes 1-N 101-105, each of which is coupled to the network 110 via a respective network connection. The network nodes 1-N 101-105 may be a station, an access point, or a personal basic service set control point. The network nodes 1-N 101-105 may include a source device that is the source of audiovisual data streams. A source device includes a data generation circuit (e.g., an encoder) and a transceiving circuit. The data generation circuit generates audiovisual data streams and the transceiving circuit transmits audiovisual data streams. For example, the network node 2 102 can be a mobile phone, a digital video disc (DVD) player, a blu-ray player, a cable box, an internet protocol television (IPTV) box, a laptop, or an integrated circuits (IC) within such devices. Network nodes 1-N 101-105 may include a sink device that receives audiovisual data streams, such as liquid crystal display (LCD) televisions, LCD monitors, or ICs within such devices. One or more network nodes 1-N 101-105 may include a communication link interface such as a high definition multimedia interface (HDMI), a mobile high definition link (MHL) interface, or display port (DP) interface. One or more network nodes 1-N 101-105 may include a processor and non-volatile memory coupled to the processor and storing instructions to carry out the functions attributed to the nodes described herein.

Figure 2:
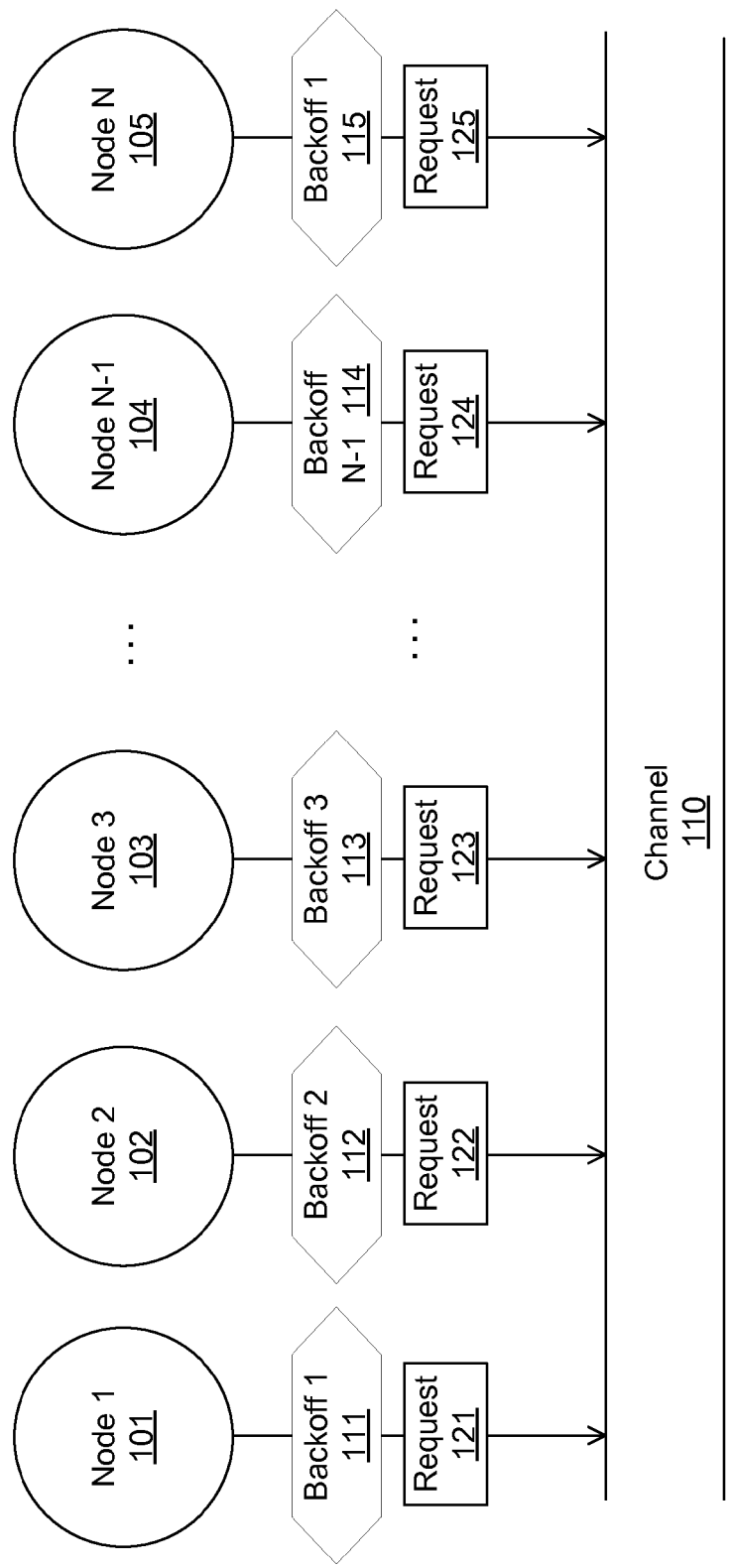
FIG. 2 is a diagram illustrating a contention-based channel acquisition mechanism implemented in the system of FIG. 1, according to one embodiment.

One or more network nodes of the network nodes 1-N 101-105 follow contention-based channel access protocols to access a channel. FIG. 2 is a diagram illustrating a contention-based channel acquisition mechanism implemented in the system of FIG. 1, according to an embodiment. The network nodes 1-N 101-105 perform a distributed coordination function (DCF) and contend for the channel 110 to transmit each of their respective payloads. When a channel 110 is busy, a network node updates its local channel occupancy information. When the channel 110 is recognized free according to the network node's local channel occupancy information, the network node generates a random back off time period after a short period of time (e.g., a Short Interframe Space (SIFS)). The random back off time period may be a number selected from a predetermined range. The back off time period for each network node is random to prevent collision among multiple network nodes generating the same back off time period. After its random back off time period, if the network node detects that the channel is available, the network node sends a request to send (RTS). An RTS is a short packet that carries information identifying a destination node and specifying a time period (e.g., a transmission opportunity) needed for sending the payload. For example, the network nodes 1-N 101-105 contend to send a payload using the channel 110. The network node 1 sends an RTS 121 to reserve the channel 110 for transmitting its payload after a random back off time period 1 111, the network node 103 sends an RTS 123 to reserve the channel 110 for transmitting its payload after a random back off time period 2 112, and the network node N 105 sends an RTS 125 to reserve the channel 110 for transmitting its payload after a random back off time period N 115.

Each request includes information specifying the length of a transmission opportunity. The transmission opportunity (TXOP) is a period of time a node can continuously access the channel without interruption after access to the channel is acquired. Because an RTS includes information indicating a time period needed for sending the payload, a network node reserves the channel 110 until the end of the transmission of a payload. All the other network nodes that detect the RTS update their local channel occupancy information of the channel (e.g., Network Allocation Vector (NAV)) with the information carried in the RTS.

A destination node receives the RTS and determines whether it is available to receive the payload. The destination node responds with a clear to send (CTS) after confirming its availability to receive the payload. A CTS is a short packet that carries information identifying a sending node and the time left in the transmission opportunity. After receiving the RTS, the destination node sends a CTS after a short period of time (e.g., a Short Interframe Space (SIFS)). Any node that is not the sending node or the destination node that receives an RTS or a CTS updates its local information of the channel occupancy (e.g., NAV). When detecting an RTS or a CTS, a node that is not the sending node or the destination node does not transmit any packet during the TXOP reserved by the sending node. After receiving the CTS, the sending node starts transmitting the payload. The payload may be sent in one or more data packets. The sending node may transmit a data packet after a short period of time (e.g., a SIFS) after receiving the CTS. Every packet sent during a TXOP may carry the information specifying the amount of time left in the TXOP. The destination node responds with an acknowledgement (ACK) to the sending node when successfully receiving a data packet. After receiving a data packet, the destination node may send an ACK after a short period of time (e.g., a SIFS). After TXOP expires, the nodes 1-N 101-105 may start contending for the channel 110 after a time period (e.g., DIFS).

Payloads sent by different nodes can be of different priorities. The random back off period for network nodes 1-N 101-105 can be selected from different predetermined ranges. In addition, the network nodes can reserve TXOPs of different durations. As such, nodes that send payloads of higher priorities can access a channel sooner and for a longer period of time than nodes that send payloads of lower priorities. In various embodiments, a payload is a burst of video data that is generated periodically. That is, the payload is an instance of a video data stream generated periodically. In some embodiments, one of the network nodes 1-N 101-105 sends out an RTS prior to receiving a payload for transmission, as illustrated in FIG. 3.

Figure 3:
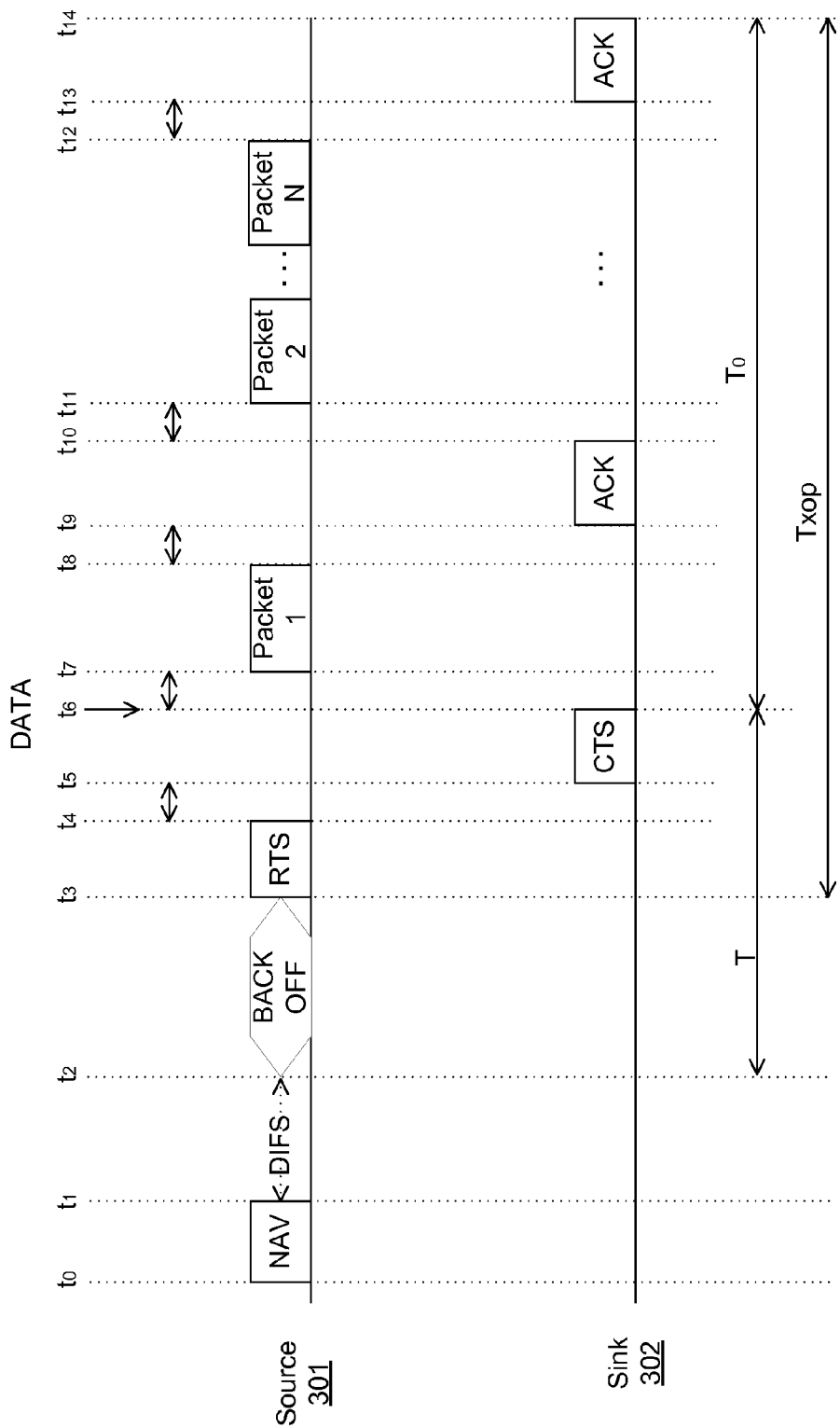
FIG. 3 is a diagram illustrating a contention-based channel acquisition mechanism implemented in the system of FIG. 1, according to one embodiment.

FIG. 3 is a diagram illustrating a contention-based channel acquisition mechanism implemented in the system of FIG. 1, according to one embodiment. In the illustrated example, the source device 301 is a sending node and the sink device 302 is a destination node. The source device 301 updates its Network Allocation Vector (NAV) at a time point $t_0$. At a time point $t_1$, the channel is determined to be free according to the NAV. The source device 301 and other nodes in the network that expect to send data, wait for a DCF Interframe Space (DIFS) time period and enter into a new back off period to contend for the channel.

Beginning at time point $t_2$, the source device 301 monitors the back off time period of its back off timer. The back off timer expires in a back off time period $T_{backoff}$. The back off time period is a random number generated from a predetermined range. At a time point $t_3$, after the back off time period $T_{backoff}$ expires, the source device 301 sends an RTS to reserve a channel for transmission of video data. The source device 301 sends the RTS prior to the arrival of the video data at a time point $t_6$. At time point $t_4$, the source device 301 finishes sending the RTS and the sink device receives the RTS. At time point $t_5$, after a SIFS time period, the sink device 301 receives a CTS sent from the source device 302 confirming its availability to receive the video data. The CTS grants the source device 301 access to the channel to send the video data to the sink device 302.

The source device 301 initiates contending for a channel a time period T before the arrival of the video data. The minimum time period $T_{min}$ for the time period T may be determined as:

$$T_{min} = t_6 - t_2 = T_{backoff\text{-}MAX} + T_{RTS} \text{SIFS} + T_{CTS} \quad (1),$$

where $T_{backoff\text{-}MAX}$ is the maximum back off time period for a sending node (e.g., the source device 301), $T_{RTS}$ is a time period for transmitting an RTS, $T_{CTS}$ is a time period for transmitting a CTS, SIFS is a time period between a sending node completing sending the RTS and receiving the CTS. For a network node, the range for generating its random back off time period $T_{backoff}$ is from a minimum back off time period $T_{backoff\text{-}Min}$ to a maximum back off time period $T_{backoff\text{-}MAX}$. In some embodiments, the source device 301 sets T according to the minimum time period $T_{min}$ determined in Equation (1) every time it initiates sending an RTS for the video burst. In one embodiment, the source device 301 configures the time period T as the predetermined value $T_{min}$. As bursts of video data arrive at the source device periodically, the source device 301 expects an instance of a burst of video data to arrive at a known (or estimated) future time point. The source device 301 monitors its back off time period to initiate contending for a channel by the time period T earlier than the future time point.

For optimal efficiency, the source device 301 receives the data immediately following receipt of the CTS. If the data is received prior to receipt of the CTS, transmission of the data is delayed by an undesirable lag between when the data is received and when it is transmitted over the channel. On the other hand, if the data is received later than receipt of the CTS, the channel is reserved by the source device 301 and other nodes are prevented from using the channel while the source device 301 still waits for the data to arrive. While Equation (1) determines the least time period the source device 301 should send the RTS in advance of the expected data, this value may be suboptimal under certain network conditions. For example, when the channel is very busy, more than one RTS may be required before the source device 301 can successfully reserve the channel. In this case, it is desirable to send the RTS earlier than the time period defined by Equation (1) to increase the likelihood that the source device 301 is able to reserve the channel prior to the data arriving.

In some embodiments, the source device 301 adjusts the value of the time period T dynamically based on changing channel conditions. The source device 301 monitors when the CTS is received and when the video data arrives in previous sessions. The source device 301 increases the time period T when the video data arrived by at least a threshold amount earlier than the CTS was received in a previous session (or when the video data arrives, on average, at least the threshold amount earlier than the CTS over a plurality of previous sessions). The source device 301 decreases the time period T when the video data arrived by at least a threshold amount later than the CTS was received in a previous session (or when the video data arrives, on average, at least the threshold amount later than the CTS over a plurality of previous sessions). The source device only decreases the time period T to the minimum time period $T_{min}$ defined by Equation (1).

At time point $t_6$, the video data arrives for transmission. A transceiving circuit of the source device receives the video data generated by the data generation circuit of the source device at the time point $t_6$. After a SIFS, the source device 301 transmits the video data beginning at $t_7$. The video data may be sent in one or more data packets such as media access control protocol data units (MPDUs) or one or more aggregated MPDUs (A-MPDUs). After receiving a data packet, the sink device 302 responds with an ACK. For example, after receiving the packet 1 sent at time point $t_7$, after a SIFS, the sink device responds with an ACK at time point $t_9$. After receiving an ACK, the source device 301 transmits the next data packet till the end of the video data. For example, after a SIFS, the source device 301 sends the data packet 2 at time point $t_{11}$ after receiving the ACK at time point $t_{10}$. The source device 301 completes sending the video data at time point $t_{12}$, and the sink device 302 sends the ACK to acknowledge receiving the last data packet N at time point $t_{13}$. At time point $t_{14}$, the sink device 302 completes sending the ACK.

In the RTS, the source device 301 includes the information specifying how long it takes to transmit a burst of video data to ensure the channel is reserved for a sufficient time period during which the burst of video data can be transmitted. The source device 301 determines the time period TXOP it takes to transmit a burst of video data. The time period TXOP includes the time period T for initiating reserving the channel prior to the burst of video data arriving and the time period $T_0$ for transmitting the burst of video data to the sink device 302. The source device 301 determines the time period $T_0$ for transmitting the video data to the sink device 302. The time period $T_0$ is the amount of time it takes for the source device 301 to transmit the video data received at time point $t_6$ to the sink device 302. The time period $T_0$ may be determined as:

$$T_0 = t_{14} - t_6 = N^*(T_{packet} + T_{ACK} + 2^* \text{SIFS}) \quad (2),$$

where N is the quantity of data packets required to send the maximum length of video data, $T_{packet}$ is a time period for sending a data packet (e.g., an MPDU), $T_{ACK}$ is a time period for sending an ACK, SIFS is a time period between a sending node sending a data packet and receiving an ACK or a CTS or a time period between a receiving node receiving a data packet and sending an ACK.

The source device 301 determines the minimum length of a TXOP included in the RTS as:

$$TXOP_{min} = T_{min} + T_0 - T_{backoff-MAX} = \quad (3)$$
$$T_{RTS} + SIFS + T_{CTS} + N*(T_{packet} + T_{ACK} + 2*SIFS),$$

where $T_{backoff\text{-}MAX}$ is the maximum back off time period for a sending node (e.g., the source device 301), $T_{RTS}$ is a time period for transmitting an RTS, $T_{CTS}$ is a time period for transmitting a CTS, N is the quantity of data packets required to send the maximum length of video data, $T_{packet}$ is a time period for sending a data packet, $T_{ACK}$ is a time period for sending an ACK, SIFS is a time period between a sending node completing sending an RTS and receiving a CTS, a time period between a sending node sending a data packet and receiving an ACK or a CTS, or a time period between a receiving node receiving a data packet and sending an ACK.

For optimal efficiency, the source device 301 receives the data immediately following receipt of the CTS. While Equation (3) determines the least time period the source device 301 needs to reserve the channel for transmitting a burst of video data when sending the RTS, this value may be suboptimal under certain network conditions. For example, if the data is received later than receipt of the CTS, the channel is reserved insufficiently for the source device 301 to complete transmitting a burst of video data. In this case, it is desirable to reserve the channel longer than the time period defined by Equation (3) to complete transmitting a burst of video data. In some embodiments, the source device 301 adjusts the value of the time period TXOP dynamically based on changing channel conditions. The source device 301 monitors when the CTS is received and when the video data arrives in previous sessions. The source device 301 increases the time period TXOP when the video data arrived by at least a threshold amount later than the CTS was received in a previous session (or when the video data arrives, on average, at least the threshold amount later than the CTS over a plurality of previous sessions).

The $TXOP_{min}$ defined by Equation (3) may be longer than needed to finish transmission of a burst of video data, and an end of transmission signal may be used to truncate the $TXOP_{min}$. As bursts of video data may correspond to various video scenes and have different sizes. For example, when a video scene changes to a flat and compression friendly part of the video, the burst of video data may be smaller than the typical average size of a burst of video data. In various embodiments, a sending node sends an end of transmission signal (e.g., a Contention-free-end (CF-END)) to indicate transmission of the video data is completed. The receiving node may respond with an end of transmission signal (e.g., a Contention-free-end (CF-END)) to indicate transmission of the video data is completed. Other network nodes, after detecting the end of transmission signal sent by the sending node or the receiving node, update their knowledge of the channel occupancy and resume contending for the channel after a DIFS.

Figure 4:
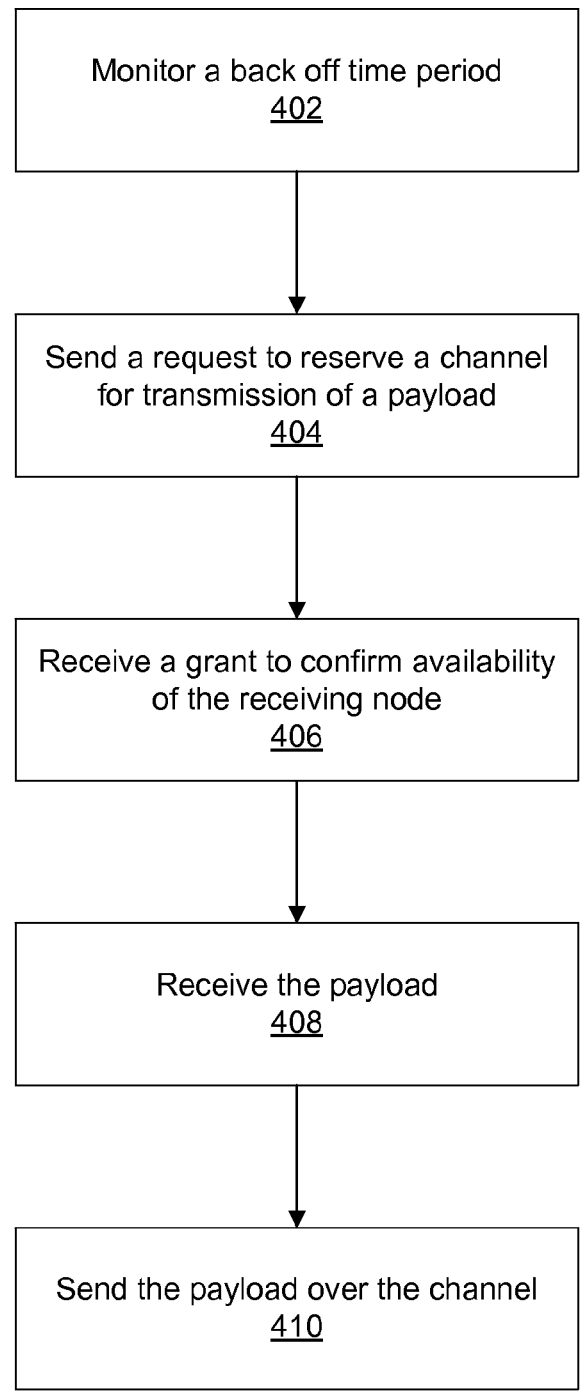
FIG. 4 is a flow diagram illustrating a sending node acquiring a channel to transmit a payload in the system of FIG. 1, according to one embodiment.

FIG. 4 is a flow diagram illustrating a process performed by a sending node acquiring access to a channel to transmit a payload in the system of FIG. 1, according to one embodiment. The sending node monitors 402 a back off time period at a first time point. The sending node sends 404 a request to reserve a channel for transmission of the payload to a receiving node at a second time point. The sending node receives 406 a grant sent from the receiving node at a third time point. The sending node receives 408 the payload at a fourth time point. Subsequently, the sending node sends 410 the payload over the channel during the time period reserved.

Upon reading this disclosure, those of skill in the art will appreciate still additional alternative designs for a network node for acquiring bandwidth in contention-based networks for handling video traffic. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A method for communicating in a contention-based network, comprising:
    determining, by the transmitting node, a first time point for monitoring a back off time period, the first time point occurring in a time period prior to an expected time point for receiving a payload;
    monitoring, by the transmitting node at the first time point, the back off time period;
    sending, by the transmitting node at a second time point prior to receiving a payload, a request to reserve a channel for transmission of the payload;
    receiving, by the transmitting node prior to receiving the payload, a grant sent from a receiving node to confirm availability of the receiving node to receive the payload over the channel;
    receiving the payload at the transmitting node;
    sending, by the transmitting node, the payload over the channel at a third time point;
    calculating, by the transmitting node, a time difference between when the grant is received and when the payload is received;
    comparing, by the transmitting node, the time difference to a threshold; and
    adjusting, by the transmitting node, the time period between the first time point and the expected time point for receiving the payload based on the comparison.

2. The method of claim 1, wherein the payload comprises an instance of a data stream that is received periodically by the transmitting node.

3. The method of claim 1, wherein a first time period between the first time point and the third time point includes the back off time period for the transmitting node, a time period for transmitting the request, a time period for transmitting the grant, and a time period between the transmitting node sending the request and receiving the grant.

4. The method of claim 1,
    wherein the adjusting comprises increasing, by the transmitting node, the time period between the first time point and the expected time point for receiving the payload in response to the time difference being less than a threshold.

5. The method of claim 1,
    wherein the adjusting comprises decreasing, by the transmitting node, the time period between the first time point and the expected time point for receiving the payload in response the time difference being greater than a threshold.

6. The method of claim 1, further comprising:
    determining, by the transmitting node, a second time period to reserve the channel for transmitting the payload; and
    specifying the second time period with the request to reserve the channel.

7. The method of claim 6, wherein the second time period includes a time period for sending a data packet, a time period for the receiving node sending an acknowledgement, a time period between the transmitting node sending the data packet and receiving the acknowledgement, and a time period between the receiving node receiving the data packet and sending the acknowledgement.

8. The method of claim 6, further comprising sending an end of transmission signal, by the transmitting node, to indicate sending the payload is completed.

9. A first apparatus, comprising:
a data generation circuit; and
a transceiving circuit coupled to the data generation circuit, the transceiving circuit configured to:
determine a first time point for monitoring a back off time period, the first time point occurring in a time period prior to an expected time point for receiving a payload;
monitor, at a first time point, a back off time period;
send, at a second time point prior to receiving a payload, a request to reserve a channel for transmission of the payload;
receive, prior to receiving the payload, a grant sent from a second apparatus to confirm availability of the second apparatus to receive the payload over the channel;
receive the payload;
send the payload over the channel at a third time point;
calculate, by the transmitting node, a time difference between when the grant is received and when the payload is received;
compare, by the transmitting node, the time difference to a threshold; and
adjust, by the transmitting node, the time period between the first time point and the expected time point for receiving the payload based on the comparison.

10. The first apparatus of claim 9, wherein the data generation circuit is configured to generate a data stream periodically and the payload comprises an instance of the data stream.

11. The first apparatus of claim 9, wherein a first time period between the first time point and the third time point includes a back off time period for the first apparatus, a time period for transmitting the request, a time period for transmitting the grant, and a time period between the transceiving circuit sending the request and receiving the grant.

12. The first apparatus of claim 9, wherein
the adjusting comprises increasing the time period between the first time point and the expected time point for receiving the payload in response to the time difference being less than a threshold.

13. The first apparatus of claim 9, wherein
the adjusting comprises decreasing the time period between the first time point and the expected time point for receiving the payload in response the time difference being greater than a threshold.

14. The first apparatus of claim 9, wherein the transceiving circuit is further configured to:
determine a second time period to reserve the channel for transmitting the payload; and
specify the second time period with the request to reserve the channel.

15. The first apparatus of claim 14, wherein the second time period includes a time period for sending a data packet, a time period for the second apparatus sending an acknowledgement, a time period between the first apparatus sending the data packet and receiving the acknowledgement, and a time period between the second apparatus receiving the data packet and sending the acknowledgement.

16. The first apparatus of claim 14, wherein the transceiving circuit is further configured to send an end of transmission signal to indicate sending the payload is completed.

17. A first apparatus, comprising:
a processor; and
memory storing a set of instructions configured to cause the processor to:
monitor, at a first time point, a back off time period;
determine a first time point for monitoring a back off time period, the first time point occurring in a time period prior to an expected time point for receiving a payload;
send, at a second time point prior to receiving a payload, a request to reserve a channel for transmission of the payload;
receive, prior to receiving the payload, a grant sent from a second apparatus to confirm availability of the second apparatus to receive the payload over the channel;
receive the payload;
send the payload over the channel at a third time point;
calculate, by the transmitting node, a time difference between when the grant is received and when the payload is received;
compare, by the transmitting node, the time difference to a threshold; and
adjust, by the transmitting node, the time period between the first time point and the expected time point for receiving the payload based on the comparison.

18. The first apparatus of claim 17, wherein the set of instructions are further configured to cause the processor to:
determine an expected time point for receiving the payload; and
determine the first time point for monitoring the back off time period, the second time point occurring a time period prior to the expected time point for receiving the payload.

* * * * *